United States Patent
Held et al.

(10) Patent No.: US 8,276,876 B2
(45) Date of Patent: Oct. 2, 2012

(54) LIMITER FOR WATER FAUCETS EQUIPPED WITH LEVER-TYPE HANDLES

(75) Inventors: Avi Held, Holon (IL); Moshe Porat, Modiin (IL)

(73) Assignee: Little Guard Ltd., Modiin (IL)

(*) Notice: Subject to any disclaimer, the term of this patent is extended or adjusted under 35 U.S.C. 154(b) by 425 days.

(21) Appl. No.: 12/665,975

(22) PCT Filed: Jun. 19, 2008

(86) PCT No.: PCT/IL2008/000836
§ 371 (c)(1),
(2), (4) Date: Dec. 22, 2009

(87) PCT Pub. No.: WO2009/001336
PCT Pub. Date: Dec. 31, 2008

(65) Prior Publication Data
US 2010/0181509 A1    Jul. 22, 2010

Related U.S. Application Data

(60) Provisional application No. 60/929,383, filed on Jun. 25, 2007.

(51) Int. Cl.
*F16K 35/00* (2006.01)
*F16K 51/00* (2006.01)

(52) U.S. Cl. .......... 251/93; 251/288; 137/625.17; 137/625.41

(58) Field of Classification Search .......... 251/89, 251/90, 93, 284, 285, 286, 288; 137/625.17, 137/625.41, 625.46; 4/675, 676, 677, 678, 4/661
See application file for complete search history.

(56) References Cited

U.S. PATENT DOCUMENTS

| | | | |
|---|---|---|---|
| 2,659,389 A | | 11/1953 | Harvey |
| 2,720,845 A | * | 10/1955 | Whitlock, Jr. .......... 251/304 |
| 3,384,121 A | * | 5/1968 | Spencer .......... 137/625.41 |
| 3,898,709 A | | 8/1975 | Lewis |
| 3,915,195 A | * | 10/1975 | Manoogian et al. ..... 137/625.41 |
| 2,082,023 A | * | 1/1992 | D'Alayer de Costemore d'Arc .......... 137/636.3 |
| 5,363,880 A | * | 11/1994 | Hsieh .......... 137/625.17 |
| 5,992,457 A | * | 11/1999 | Humpert et al. ......... 137/625.17 |
| 7,021,501 B2 | | 4/2006 | Bauer |
| 2002/0092092 A1 | | 7/2002 | Fine |

OTHER PUBLICATIONS

International Search Report issued for PCT/IL2008/000836, dated Nov. 10, 2008.
Written Opinion of the International Search Authority issued for PCT/IL2008/000836, dated Nov. 10, 2008.

* cited by examiner

*Primary Examiner* — Eric Keasel
*Assistant Examiner* — Hailey K Do
(74) *Attorney, Agent, or Firm* — The Law Office of Michael E. Kondoudis

(57) ABSTRACT

A limiter detachably associated with a water faucet having a lever-type handle, enabling to prevent the rotational movement range of the lever-type handle. The limiter comprises a body and a limiting-handle where the limiting-handle is rotatably connected to the body. The limiter may be installed to the faucet at one of its hot or cold sides, where the limiter enables a user to rotate the limiting-handle towards and away from the lever-type handle of the faucet to physically limit the rotational movement of the lever-type handle. The limiter may be installed near the side of the faucet where hot water are controlled to serve as a safety device enabling to prevent the flow of hot water when the limiter's limiting-handle is locked in a limiting position that prevents rotating of the lever-type handle of the faucet.

7 Claims, 4 Drawing Sheets

LIMITER FOR WATER FAUCETS EQUIPPED WITH LEVER-TYPE HANDLES

CROSS REFERENCE TO RELATED APPLICATION

This application is a National Stage of International Application No. PCT/IL2008/00836 filed Jun. 19, 2008, which claims priority based on U.S. Provisional Patent Application No. 60/929,383, filed Jun. 25, 2007, both of which are incorporated herein by reference in their entirety.

BACKGROUND OF THE INVENTION

Bathing a baby in a sink or bathtub, under the water faucet is quite convenient. By setting the baby right under the water spout, one does not need to carry the clean bath water anywhere or empty a tub full of dirty water afterwards. Furthermore, bathing the baby right at the faucet ensures that fresh, warm water is readily available.

However, the hot water flowing from a water faucet may also be hazardous. If the water is too hot, there is a danger, to anyone who comes in contact with the hot water, of being burned or scalded. Burns from hot water often result in third degree burns, and can even lead to death.

The danger is especially significant to an infant's delicate skin, which may be more easily damaged by hot water than may be an adult's skin. According to some sources, thousands of children a year are burned while being bathed. In fact, when bathing infants or young children, it is strongly recommended to use only tepid or lukewarm water.

Furthermore, if the water flowing from the water faucet is too hot, the water spout itself may be heated to a temperature hot enough to produce a burn on contact.

Sinks and bathtubs equipped with water faucet assemblies operated by lever-type handles make bathing a baby especially convenient. The handle, or handles, of such a water faucet swivels left and right to adjust the mix of hot and cold water, and up and down to adjust the pressure of the water flow. The lever-type handle of a water faucet allows the water to be quickly and easily mixed with one hand, which leaves the other hand free to hold the baby, reach for the soap, etc.

However, the same facility with which the lever-type handle of a water faucet can be moved intentionally also means that an unintentional movement can just as easily remixed or open the water. For example, one might accidentally bump the lever-type faucet handle when reaching for the soap. Such an unintentional movement may cause the lever-type handle to increase the flow of hot water. Or the baby might reach out to play with the lever-type handle, and unknowingly turn the water on. In either case, if too much hot water flows, even for a moment, there is a risk that the delicate skin of the baby will be burned.

Therefore, there is a need for a means to limit the flow of water from a water faucet operated by at least one lever-type handle, in order to protect against the risk of accidental burns and scalding that can result from using water that is too hot.

A patent application number WO8504233, which is incorporated herein by reference in its entirety, discloses a limiting arrangement for controlling the maximum temperature of the mixed water in a single-grip mixing valve. A cover of the valve's control unit is provided with pockets or equivalent to receive a limiter body. Each of the pockets enables blocking the rotation movement of the valve limiting it to a predefined position (locking predefined percentages of the water flow).

A patent number GB2312490, which is incorporated herein by reference in its entirety, discloses a valve actuator cover that comprises a body having a cavity in which the actuator is received in use to prevent access to the actuator. The body is secured to a valve by elements, which may be traversed to increase the available opening for receiving the actuator when fitting the cover. The elements may be secured by coupling arrangements to prevent elements traversing laterally when a force is applied to the body.

A patent number U.S. Pat. No. 5,363,880, which is incorporated herein by reference in its entirety, discloses a hot/cold water mixing faucet that includes a conical bonnet fastened to the faucet body thereof at the top and fixed in position by a flush bolt, which has a longitudinal stop edge on the outside to limit the turning angle of the handle of the faucet. The bonnet also includes a spring-supported stop member mounted on the handle and having a front stop bar stopped against the a low-level surface on the conical bonnet at one side of the longitudinal stop edge, whereby the conical bonnet can be set at the desired position closer to the hot water inlet or the cold water inlet, by means of controlling the flush bolt, so as to limit the maximum output water temperature within the desired range.

All the above-mentioned patents and patent applications require sophisticated plumbing and integrating of the limiting means in the faucets and valves assemblies. These solutions mainly require the valve/faucet to be especially designed to receive the limiting means. This may require the customer to buy a new faucet in order to have these water-flow limiting means.

SUMMARY OF SOME EMBODIMENTS OF THE INVENTION

The present invention, in some embodiments thereof, provides a limiter, which is a device enabling to a user to control the temperature of water exiting a water faucet by preventing the rotational movement range of a lever-type handle of a water faucet having that lever-type handle. The limiter may be detachably associated with the water faucet.

A lever-type handle is known in the art and commonly used in water faucets enabling to control the intensity of the water flow by rotating the lever-type handle along a vertical axis and to control the ratios between hot and cold water (meaning the temperature of the water) by the rotating the lever-type handle along a horizontal plane (around the vertical axis). Additionally, rotating the lever-type handle along a vertical axis enables controlling and limiting the water flow.

According to some embodiments of the invention, the limiter may enable a user to rotate said limiting-handle towards the lever-type handle of the faucet to physically limit the rotational movement of said lever-type handle.

The limiter may either be installed near said faucet or to the faucet in a removable manner.

According to some embodiments of the invention, the rotational movement of said limiting-handle may enable limiting the hot water flow resulting from the rotation of said lever-type handle, thereby enable the user to control the water temperature.

According to some embodiments of the invention, the faucet may further comprise a waterspout, installation means and two water inlets (hot and cold). Each said inlet may be connected to a water type piping (hot or cold), which enables directing one of: cold or hot water towards the waterspout. The inlets may be threaded through openings in said installation means, which may enable installing the faucet to a wall therefrom.

According to some embodiments of the invention, the limiter may be installed near the inlet of the hot water to enable limiting the user in rotating the lever-type handle towards the hot water inlet, thereby limiting the flow rate of the hot water.

Additionally, the limiter may further comprise a connector that may be a hinge member enabling to rotatably connect the limiting-handle to the body.

According to some embodiments of the invention, the body of the limiter may comprise a first opening to enable threading said connector therethrough and a second opening enabling to thread one of the faucet's inlets (e.g. the hot water inlet) therethrough to install said limiter to said faucet.

According to some embodiments of the invention, the connector additionally comprises at least one locking means enabling to lock and unlock the ability to rotate the limiting-handle of said limiter in one or more locking positions.

For example, the connector may comprise a button, operatively associated with said locking means, wherein said button enables locking and unlocking the ability to rotate the limiting-handle by pressing said button. The button and locking means may enable locking the limiting-handle in one of two positions: (i) one positions may enable completely blocking the rotation ability of the lever-type handle in the direction of one of the inlets where the limiter is installed, which is referred to as "the limiting position"; and (ii) another position, which is "the unlimiting position", where the limiting-handle is locked away from the lever-type handle and enables to freely rotate the lever-type handle.

According to some embodiments of the invention, the front part of the limiter's body may additionally include at least one indicator operatively associated with the connector's locking means, wherein said indicator enables indicating whether the button is pressed or un-pressed therefore whether the rotation of the limiting-handle is locked or unlocked.

According to some embodiments of the invention, the body of the limiter may comprise at least two parts that enable connecting to one another, where said limiting-handle may be an angular shaped member comprising a protruding first member and a second member, which are integrally connected to one another, creating an angle between them which is one of: smaller or equal to 90° degrees. The body's parts may create a niche when connected to one another, for inserting of the edge part of the second member of the limiting-handle therein, where said limiting-handle is connected to those parts through said connector in a rotatable manner to one another.

According to some embodiments of the invention, the limiter may be installed near one of the lever-type handle of the faucet, externally from the faucet, where said limiting-handle's length may be adapted to enable limiting the rotation movement of the lever-type handle.

According to some embodiments of the invention, the rotating of the lever-type handle 110 in a horizontal plane determines the ratios between the hot and the cold water flow and rotating the lever-type handle along a vertical axis determines the general flow intensity of the water, where said limiting-handle enables limiting the rotation movement of the lever-type handle in the horizontal plane to allow controlling the ratio between the hot and cold water flow.

According to some embodiments of the invention, allowing the user to control the temperature of water exiting a faucet using the limiter, may be carried out by (i) rotating the limiting-handle towards the lever-type handle to physically limit the rotation range of the lever-type handle; and (ii) rotating the limiting-handle away from the lever-type handle to allow full rotation range of the lever-type handle.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying figures, wherein.

The figures together with the description make apparent to those skilled in the art how the invention may be embodied in practice.

DESCRIPTION OF SOME EMBODIMENTS OF THE INVENTION

The present invention, in some embodiments thereof, provides a limiter 300, which is a safety device that can be installed to a lever-type faucet 100 to enable a user to control the temperature of water exiting a water faucet 100 by limiting the rotational and vertical movement of a lever-type handle 110 of the water faucet 100.

Figure 1A:
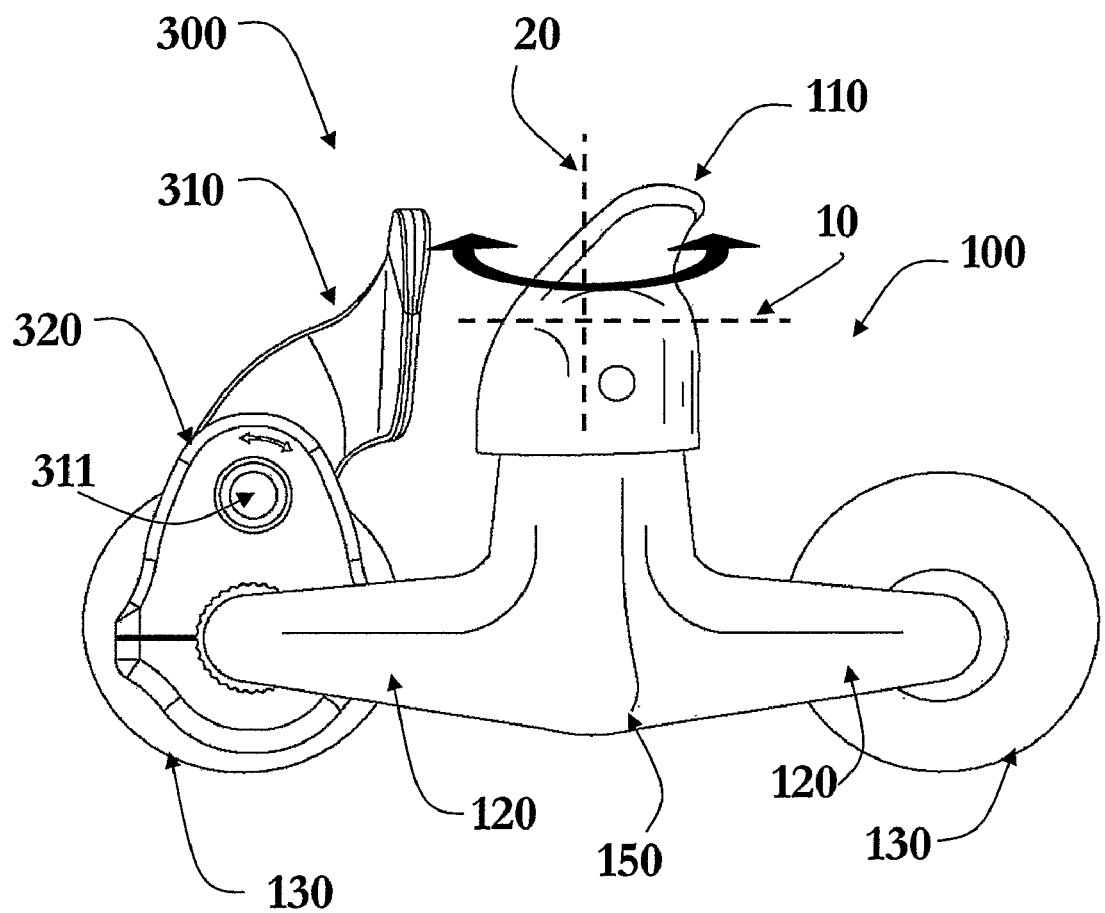
FIG. 1A is side view of a water faucet with a lever-type handle comprising a limiter in a limiting position, according to some embodiments of the present invention.
Figure 1B:
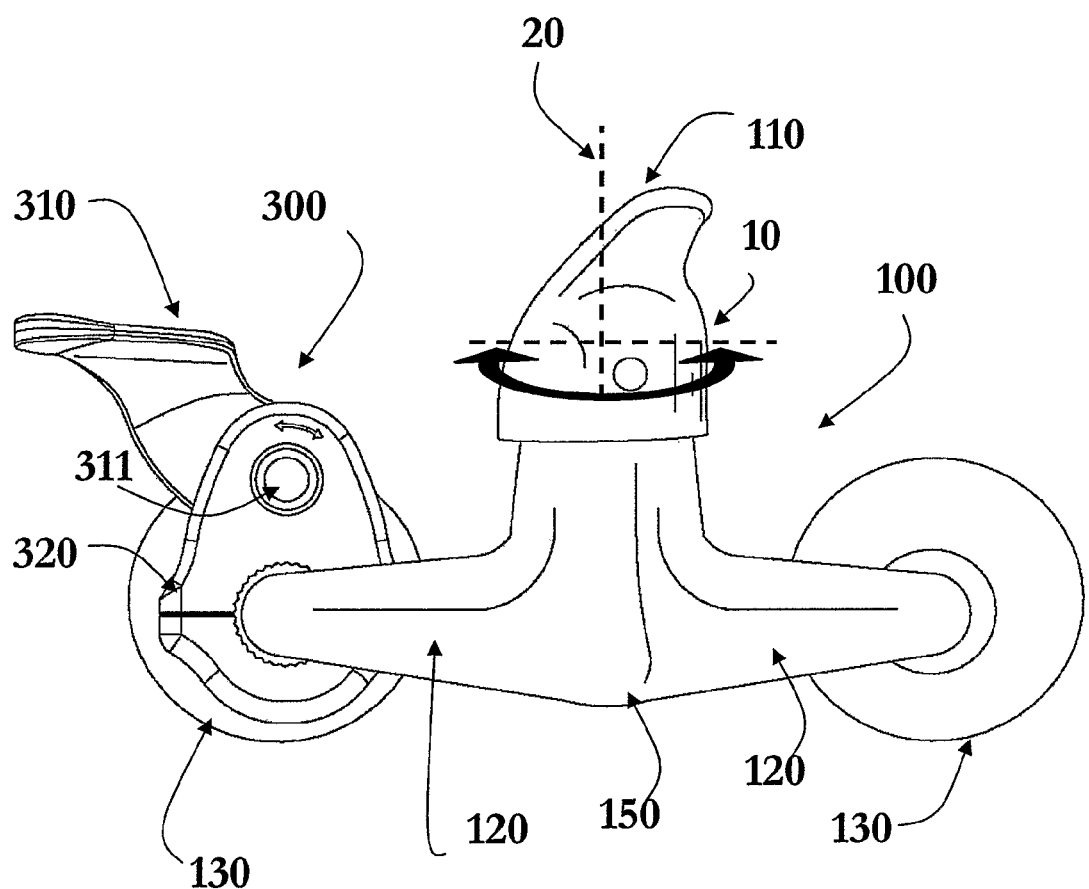
FIG. 1B is side view of a water faucet with a lever-type handle comprising a limiter in an unlimiting position, according to some embodiments of the present invention.

A lever-type faucet 100 is a water tap or valve that allows controlling the water flow level and the ratios between hot and cold water flows by rotating the lever-type handle 110 of the faucet 100 sideways in a horizontal rotational movement in a horizontal plane 10 (meaning around a vertical axis 20, where the vertical axis 20 is the center of rotation) as well as in a vertical rotational movement along a vertical axis 20, as illustrated in FIG. 1A and FIG. 1B.

Usually, the vertical rotational movement determines the general water flow intensity while the sideways horizontal rotational movement determines the ratios between hot water flow and cold water flow, where each side usually represents the extreme (hot/or cold).

For the purpose of illustrating the invention, the left side will present the hot water inlet of the faucet 100 and the right side the cold water inlet of the faucet 100, but of course it can be the other way around.

The limiter 300, provided herein, according to some embodiments of the invention, may enable limiting the range of movement available to the faucet's 100 lever-type handle 110. The limiter 300 may be detachably associated with the faucet 100 and may be either completely externally and separately adjacent to the faucet 100, or removably mounted through or on some parts of the faucet 100, where the faucet 100 and the limiter 300 are two separated parts. The limiter 300 may enable a user to rotate a limiting-handle 310 of the limiter 310 towards the lever-type handle 110 of the faucet 100 to limit the rotational movement of said lever-type handle 110 thereby limiting the water flow resulting from the rotation of said lever-type handle 110.

Implementation of the present invention successfully addresses the problems discussed above, including preventing the accidental movement of a lever-type handle 110, limiting the flow of the hot water, and thereby preventing a waterspout 150 from becoming dangerously hot.

The limiter 300 may enable completely locking into two or more positions enabling to: (i) allow a user to carry out the full horizontal rotation of the handle 110 as originally designed according to the faucet 100 design (referred to hereinafter as the "unlimiting position"); and (ii) completely lock the horizontal rotation range of the handle 110 preventing the user from rotating the handle 110 towards the side of the inlet 120 where the limiter 300 is installed (referred to hereinafter as the "limiting position").

A "user" may be any person who either locks/unlocks the limiter 300 (e.g. an adult) or any person from which the rotation of the faucet's 100 lever-type handle 110 is prevented by the limiter 300 (e.g. children or elderly persons).

It is to be understood that an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It is understood that the phraseology and terminology employed herein is not to be construed as limiting and is for descriptive purpose only.

The principles and uses of the teachings of the present invention may be better understood with reference to the accompanying description, figures, and examples.

It is to be understood that the details set forth herein should not be construed as limiting any applications of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, integers or groups thereof and that the terms are not to be construed as specifying components, features, steps or integers.

The phrase "consisting essentially of", and grammatical variants thereof, when used herein, is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not to be construed as there being only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods, and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

FIG. 1A and FIG. 1B are side views of a water faucet 100 with a lever-type handle 110 comprising a limiter 300 in a locked and unlimiting positions, respectively, according to some embodiments of the present invention.

According to these embodiments, the faucet 100 may comprise:
  the lever-type handle 110;
  a water spout 150, which is a tube from which the water flow toward the waterspout 150;
  hot water and cold water inlets 120 where each inlet 120 is connected to a pipeline that is associated with its respective water type (hot or cold); and
  installation means 130 enabling to install each of the inlets 120 to a wall thereby to install the faucet 100 to the wall (where the "wall" may be any means for holding the faucet 100 as known in the art).

The hot water inlet 120 may be connected to a hot water pipeline enabling channeling water from a boiler tank where the water can be heated.

As illustrated in FIG. 1A and FIG. 1B, the installation means 130 may be cylindrically shaped members with openings that are designed to receive the inlets 120 therethrough.

According to some embodiments of the invention, as illustrated in FIG. 1A and FIG. 1B, the limiter 300 may comprise limiting-handle 310 and a body 320. The limiting-handle 310 may be rotatable installed into the body 310 to allow the limiting-handle 310 to rotate around a connector 311 connecting the body 320 and the limiting-handle 310 in a rotatable manner.

The body 320 may be coupled to a selected inlet 120 (e.g. the hot water inlet 120) where the limiting-handle 310 may enable blocking the rotational movement of the lever-type handle 110 of the faucet 100 when in the limiting position, as illustrated in FIG. 1A.

Once rotated away from the lever-type handle 110 of the faucet 100, the limiting-handle 310 may be in an unlimiting position allowing a user to freely rotate the lever-type handle 100 to allow flow of hot water, for example (or the water type of the outlet 120 where the limiter 300 is installed).

Figure 2:
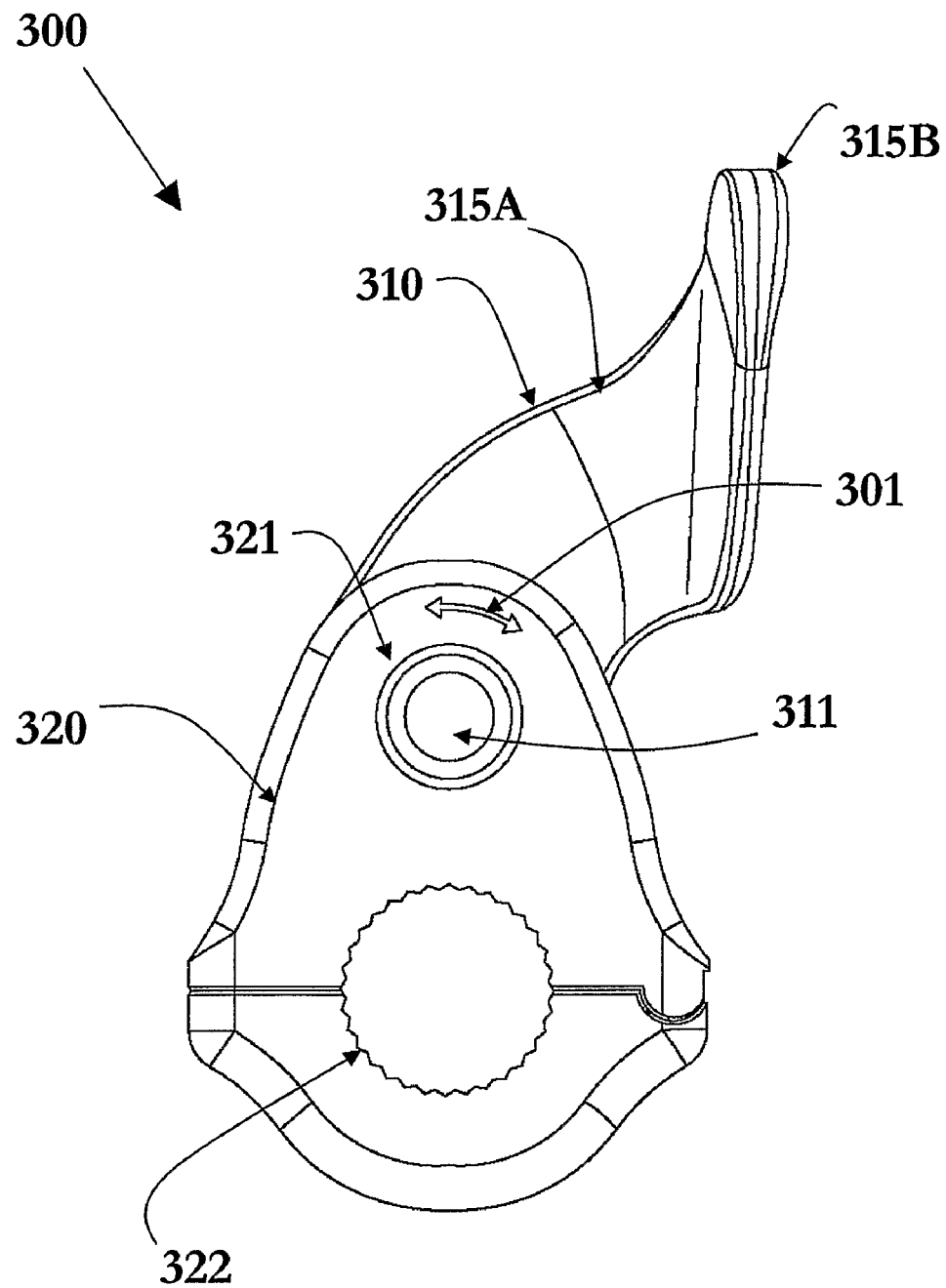
FIG. 2 is a front view of a limiter, according to some embodiments of the invention.
Figure 3:
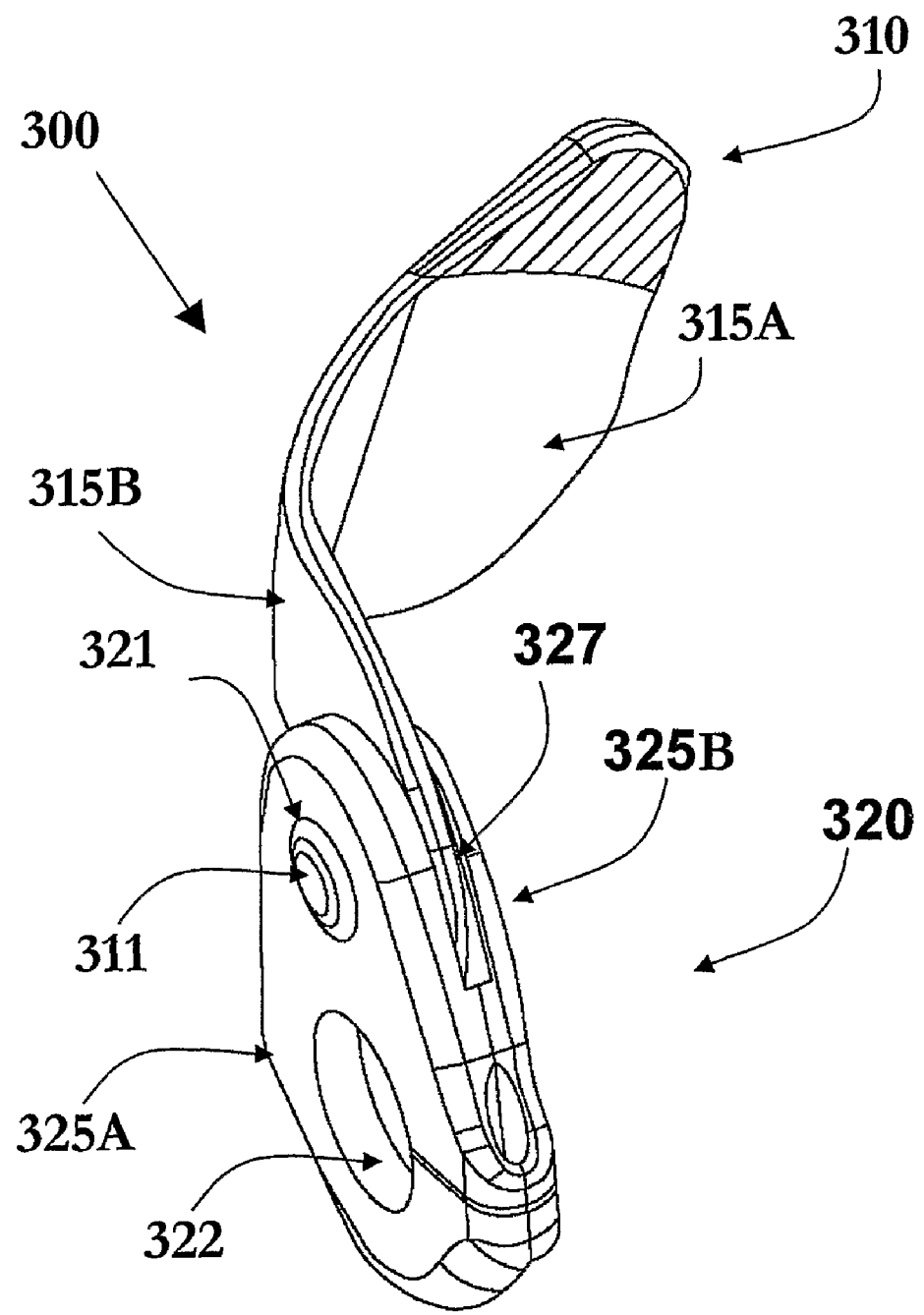
FIG. 3 is an isometric view of a limiter, according to some embodiments of the invention.

FIG. 2 and FIG. 3 schematically illustrate the limiter 300, according to some embodiments of the invention.

According to these embodiments, the limiting handle 310 may be an angular shaped member comprising a protruding first member 315A and a second member 315B, which may be integrally connected to one another, creating an angle between them which is smaller or equal to 90° degrees; and the body 320 may comprise at least two parts 325A and 325B that can be connected to one another once the limiting-handle 310 is inserted into those parts 325A and 325B.

The two parts 325A and 325B may create a niche 327 for inserting of the edge part of the second member 315 therein.

According to some embodiments of the invention, as illustrated in FIG. 3, the body 320 may comprise a first opening 321 to allow receiving of the connector 311 that can rotatably connect the limiting-handle 310 and the body 320; and a second opening 322 enabling to receive the selected inlet 120 therethrough.

According to some embodiments of the invention, the connector 311 may additionally comprise locking means enabling to lock and unlock the ability to rotate the limiting-handle 310 by, for example, comprising a button that allows executing the locking/unlocking operation.

According to some embodiments of the invention, the limiter 300 may be installed near the side of the faucet 300 where hot water are controlled to serve as a safety device enabling to prevent the flow of hot water when the limiter's 300 limiting-handle 310 is locked in a limiting position that prevents rotating of the lever-type handle 110 of the faucet 100.

This invention may enable users to install the limiter 300 in an already existing faucet 100 without having to buy a new faucet 100 with the limiter 300 installed thereto.

To install the limiter 300 of the present invention, the user may merely be required to remove the faucet 100 from the wall, thread the limiter's 300 second opening 322 through a selected inlet 120 (e.g. the hot water inlet 120), and then install the assembly of faucet 100 and limiter 300 onto the wall again using the installation means 130.

To bring the limiting handle 310 to the limiting position (see FIG. 1A) the user may turn the limiting-handle 310 towards the lever-type handle 110 thereby physically preventing the user from rotationally turning the lever-type handle 110 towards the selected inlet 120 in the horizontal plane 10. To lock the limiting-handle 310 in the limiting position, the user may be required to press the button connector 311. This locking may prevent the limiting-handle 310 from rotating, thereby locking it in the selected position.

To bring the limiting handle 310 to the unlimiting position (see FIG. 1B) the user may turn the limiting-handle 310 away from the lever-type handle 110 thereby physically allowing the user to rotationally turn the lever-type handle 110 towards the selected inlet 120 in the horizontal plane 10, thereby to open the water type of the inlet 120 where the limiter 300 is installed. To lock the limiting-handle 310 in the unlimiting position, the user may be required to press the button connector 311. This locking may prevent the limiting-handle 310 from rotating, thereby locking it in the selected position.

Unlocking the button connector 311 may enable the user to freely rotate the limiting-handle 310 towards and away from the lever-type handle 110.

According to some embodiments of the invention, the limiter 300 may comprise several locking positions (more than the two specified above) enabling to prevent the lever-type handle 110 from rotating its full rotation range in the horizontal plane 10, thereby enabling the user to control the water from exceeding specified temperature levels and rates of flow, to prevent the dangers discussed previously.

According to some embodiments of the present invention, additional coupling mechanisms may be provided to operatively connect the limiter 300 to the water faucet 100. For example, the coupling mechanism may comprise a collar mounted on a bonnet of the water faucet 100, under the lever-type handle 110. Alternatively, the coupling mechanism may enable disposing the limiter 300 on, for example, the hot water inlet 120.

According to some embodiments of the present invention, the coupling mechanism may be further equipped with adapters, thereby enabling the coupling mechanism to be affixed to the water faucet 100 of different sizes and configurations.

It should be understood that the limiter 300 may also comprise other mechanisms and devices, and may be mounted elsewhere on or near a water faucet 100 without departing from the scope of the invention.

According to some embodiments of the invention, the limiter 300 may be installed near the faucet 100 and not necessarily attached to the faucet's 100 inlet 120 or any other part of the faucet 100. For example, the limiter 300 may be attached to the wall adjacent to the faucet 100, where the size (e.g. length) of the limiting-handle 310 may be adapted to reach the lever-type handle 110 rotation-range in the horizontal plane 10.

According to some embodiments of the invention, as illustrated in FIG. 2, the front part of the body 320 may additionally include one or more indicators 301 operatively associated with the connector's 311 locking means that can indicate whether the button is pressed or un-pressed therefore whether the rotation of the limiting-handle 310 is locked or unlocked.

The limiting-handle 310 and/or the body 320 may be made from any one or more solid materials such as, for example, plastic, metal, alloys, wood, ceramics or any other solid material known in the art.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A limiter (300), which is a device enabling to prevent a rotational and vertical movement range of a lever-type handle (110) of a water faucet (100), wherein said limiter (300) comprises a body (320) and a limiting-handle (310), wherein said limiting-handle (310) is rotatably connected to said body (320), wherein said limiter (300) is detachably associated with the faucet (100) and said limiter (300) enables a user to rotate said limiting-handle (310) towards the lever-type handle (110) of the faucet (100) to physically limit the rotational movement of said lever-type handle (110), further wherein said faucet (100) further comprises a waterspout (150), installation means (130) and two water inlets (120), wherein each said inlet (120) is connected to a water type piping, which enables directing one of: cold or hot water towards the waterspout (150), and said inlets (120) are threaded through openings in said installation means (130), which enable installing the faucet (100) to a wall, and further wherein said limiter (300) is installed near the inlet (120) of the hot water to enable limiting the user in rotating the lever-type handle (110) towards the hot water inlet (120), thereby limiting the flow of the hot water, and further wherein said limiter (300) further comprises a connector (311) that is a hinge member enabling to rotatably connect the limiting-handle (310) to the body (320), wherein said body comprises a first opening (321) to enable threading said connector (311).

2. The limiter (300) of claim 1, wherein said body (320) further comprises a second opening (322) enabling to thread one of the faucet's (100) inlets (120) therein to install said limiter (300) to said faucet (100).

3. The limiter (300) of claim 1, wherein said connector (311) additionally comprises at least one locking means enabling to lock and unlock the ability to rotate the limiting-handle (310) of said limiter (300).

4. The limiter (300) of claim 3, wherein said connector (311) comprises a button, operatively associated with said locking means, wherein said button enables locking and unlocking the ability to rotate the limiting-handle (310) by pressing said button wherein said button and locking means enable locking the limiting-handle (310) in one of two positions wherein one of the positions enables completely blocking the rotation ability of the lever-type handle (110) in the direction of one of the inlets (120) where the limiter (300) is installed, which is the limiting position; and the other position, which is the unlimiting position, where the limiting-handle (310) is locked away from the lever-type handle (110) and enables to freely rotate the lever-type handle (110).

5. The limiter (300) of claim 4, wherein the front part of the body (320) additionally includes at least one indicator (301) operatively associated with the connector's (311) locking means, wherein said indicator (301) enables indicating whether the button is pressed or un-pressed therefore whether the rotation of the limiting-handle (310) is locked or unlocked.

6. The limiter (300) of claim 3 wherein said body (320) comprises at least two parts (325A and 325B) that enable connecting to one another and wherein said limiting handle (310) is an angular shaped member comprising a protruding first member (315A) and a second member (315B), which are integrally connected to one another, creating an angle between them which is one of: smaller or equal to 90 degrees, wherein said at least two parts (325A and 325B) may create a niche (327) when connected to one another, for inserting of the edge part of the second member (315) therein, connected by said connector (311) in a rotatable manner to one another.

7. A method for controlling the temperature of water exiting a water faucet (100) comprising a waterspout (150) and a lever-type handle (101), using a limiter (300), which is a device comprising a limiting-handle (310) and a body (320), wherein said limiting-handle (310) is rotatably connected to said body (320), said method comprising: rotating the limiting-handle (310) towards the lever-type handle (110) to physically limit the rotation range of the lever-type handle (101); rotating the limiting-handle (310) away from the lever-type handle (110) to allow full rotation range of the lever-type handle (110) wherein said limiter (300) is detachably associated with said faucet (100), further comprising installing the limiter (300) to the to the hot water inlet (120) of the faucet (100), wherein the body (320) of the limiter (300) comprises a second opening (322) enabling to thread the inlet (120) into the second opening (322) thereby carry out the installation.

* * * * *